United States Patent
Cali et al.

(10) Patent No.: US 12,121,051 B2
(45) Date of Patent: Oct. 22, 2024

(54) METHOD AND SYSTEM FOR OPTICAL ANALYSIS OF A COMPONENT OF AN AEROSOL GENERATING ARTICLE

(71) Applicant: PHILIP MORRIS PRODUCTS S.A., Neuchatel (CH)

(72) Inventors: Ricardo Cali, Mannheim (DE); Andreas Löb, Ludwigshafen (DE); Luca Natali, Lugo (IT)

(73) Assignee: Philip Morris Products S.A., Neuchatel (CH)

( * ) Notice: Subject to any disclaimer, the term of this patent is extended or adjusted under 35 U.S.C. 154(b) by 151 days.

(21) Appl. No.: 17/779,652

(22) PCT Filed: Nov. 11, 2020

(86) PCT No.: PCT/EP2020/081782
§ 371 (c)(1),
(2) Date: May 25, 2022

(87) PCT Pub. No.: WO2021/121790
PCT Pub. Date: Jun. 24, 2021

(65) Prior Publication Data
US 2023/0011982 A1    Jan. 12, 2023

(30) Foreign Application Priority Data

Dec. 19, 2019 (EP) .................................. 19218331

(51) Int. Cl.
*A24C 5/34* (2006.01)
*G01N 21/952* (2006.01)
(Continued)

(52) U.S. Cl.
CPC .......... *A24C 5/3412* (2013.01); *G01N 21/952* (2013.01); *H05B 6/105* (2013.01); *G01N 2021/8848* (2013.01)

(58) Field of Classification Search
CPC ...... A24F 47/008; A24F 47/006; A24F 40/46; A24F 40/20; A24F 40/465; A24F 42/10;
(Continued)

(56) References Cited

U.S. PATENT DOCUMENTS

2018/0372482 A1* 12/2018 Consolante ............ G01B 11/04
2019/0053535 A1* 2/2019 Apetrei Birza ...... A24B 15/167
(Continued)

FOREIGN PATENT DOCUMENTS

WO    2017/108819    6/2017
WO    2017/178394    10/2017

OTHER PUBLICATIONS

PCT Search Report and Written Opinion for PCT/EP2020/081782 dated Jan. 29, 2021 (10 pages).

*Primary Examiner* — Hoa Q Pham
(74) *Attorney, Agent, or Firm* — Mueting Raasch Group

(57) ABSTRACT

The invention relates to a method for optical analysis of a component of an aerosol generating article, the method comprising: —providing a component of an aerosol generating article defining a first end and a second end, the component comprising: o an aerosol forming substrate; o a susceptor in thermal contact with the aerosol forming substrate; —providing a first polarized camera including a sensor to detect polarization information of electromagnetic radiation; —illuminating the component by electromagnetic radiation; —detecting transmitted, infected or refracted electromagnetic radiation from the component by the first polarized camera; —generating a first image of the first end of the component by the first polarized camera, the first image being formed by a plurality of pixels, each pixel of the plurality of pixels containing polarization information about the detected electromagnetic radiation; and—detecting in the first image a position of the susceptor.

15 Claims, 5 Drawing Sheets

(51) Int. Cl.
*H05B 6/10* (2006.01)
*G01N 21/88* (2006.01)

(58) Field of Classification Search
CPC .......... A24D 1/20; G01B 11/04; G01B 11/10; G01B 11/24; G01B 11/02; G01B 11/14; A24C 5/3412; A24C 5/01; G02B 5/04; G01N 21/952; G01N 21/4788; G01N 2021/8848; G03F 7/70625; H05B 6/105; H05B 3/22
USPC .... 356/335–343, 73, 601–623, 237.1–237.5, 356/364–369
See application file for complete search history.

(56) References Cited

U.S. PATENT DOCUMENTS

| | | | |
|---|---|---|---|
| 2020/0253274 A1* | 8/2020 | Reevell | A24F 40/40 |
| 2022/0015413 A1* | 1/2022 | Black | A24F 40/465 |

* cited by examiner

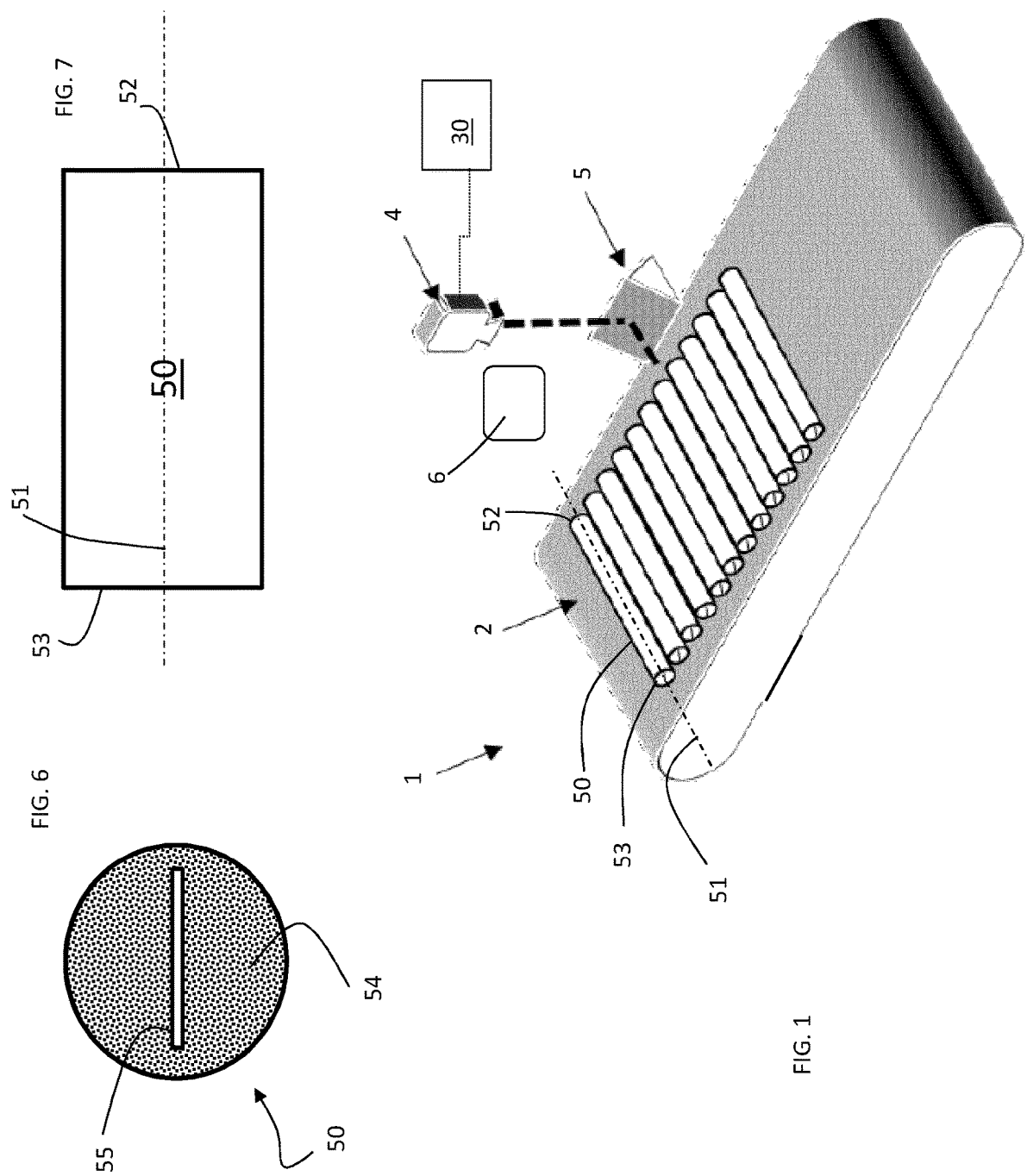

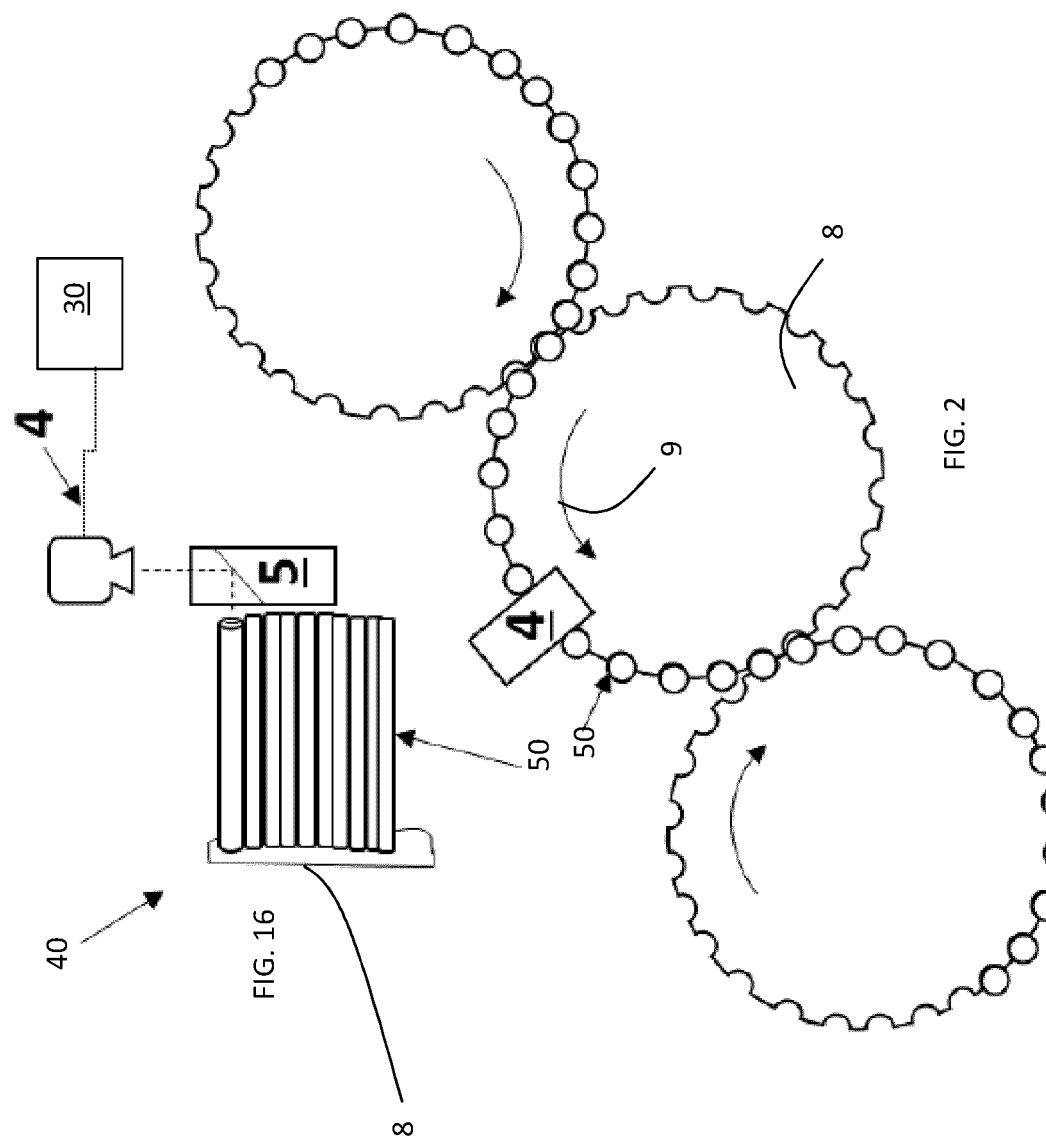

METHOD AND SYSTEM FOR OPTICAL ANALYSIS OF A COMPONENT OF AN AEROSOL GENERATING ARTICLE

This application is a U.S. National Stage Application of International Application No. PCT/EP2020/081772 filed Nov. 11, 2020, which was published in English on Jun. 24, 2021, as International Publication No. WO 2021/121790 A1. International Application No. PCT/EP2020/081772 claims priority to European Application No. 19218331.7 filed Dec. 19, 2019.

The present invention relates to a method and a system for optical analysis of a component of an aerosol generating article. In particular, the method and the system are adapted to detect the location of a susceptor contained in the component of the aerosol generating article.

Aerosol generating devices are known, which comprise an aerosol-forming substrate and an inductive heating device. The inductive heating device comprises an induction source which produces an alternating electromagnetic field which induces heat generating eddy currents and hysteresis losses in a susceptor. The susceptor is in thermal proximity of the aerosol-forming substrate, for example a tobacco substrate. The heated susceptor in turn heats the aerosol-forming substrate which comprises a material which is capable of releasing volatile compounds that can form an aerosol.

In some components, the susceptor is positioned inside an aerosol generating article, also containing the aerosol forming substrate.

Because of manufacturing tolerances, it may occur that the susceptor in the component is not in the desired position, or it does not have the proper orientation.

If the susceptor remains in the not correct position or orientation, a lack of product conformity in terms of deliveries of the aerosol when the component is used in an aerosol generating device may be obtained.

It is therefore desirable to detect such defects as early as possible to ensure that only compliant components are produced and that unnecessary costs and waste are avoided.

In an aspect, the invention relates to a method for optical analysis of a component of an aerosol generating article. The method comprises providing a component of an aerosol generating article defining a first and a second end, wherein the component comprises: an aerosol forming substrate; and a susceptor in thermal contact with the aerosol forming substrate. The method preferably further comprises providing a first polarized camera including a sensor to detect polarization information of electromagnetic radiation. The method may comprise illuminating the component by electromagnetic radiation. The method may comprise detecting transmitted, refracted or reflected electromagnetic radiation from the component by the first polarized camera. The method may comprise generating a first image of the first end of the component by the first polarized camera, the first image being formed by a plurality of pixels, each pixel of the plurality of pixels containing polarization information about the detected electromagnetic radiation. Further, the method comprises detecting in the first image a position of the susceptor.

In another aspect, the invention relates to a system for the production of a component of an aerosol generating article, wherein the component comprises: a longitudinal axis; a first end and a second end; an aerosol forming substrate; and a susceptor in thermal contact with the aerosol forming substrate. The system also comprises a first source of electromagnetic radiation adapted to illuminate the component. The system may also comprise a first polarized camera including a sensor to detect polarization information of electromagnetic radiation, the first polarized camera defining a first field of view, the first polarized camera being so arranged that the first end of the component is in the first field of view, the first polarized camera being adapted to generate a first image of the first end of the component, the first image being formed by a plurality of pixels, each pixel of the plurality of pixels containing polarization information of the electromagnetic radiation detected by the camera. The system may also comprise a control unit adapted to process the first image and to detect in the first image a position of the susceptor.

It has been found that taking an image by a polarized camera of an end of the component of an aerosol generating article, component that includes a susceptor, improves the visibility of the position of the susceptor in the image, when compared to images taken with any other camera. Checking the correct position of the susceptor while manufacturing the components of an aerosol generating article allows to remove the defective components as soon as possible, limiting the waste of material. The polarized camera is fast enough to allow a processing of the images during production.

As used herein, the term "aerosol generating article" refers to an article comprising an aerosol forming substrate that, when heated, releases volatile compounds that can form an aerosol. Preferably, the aerosol generating article is a heated aerosol generating article. The heated aerosol generating article is an aerosol generating article which comprises an aerosol-forming substrate intended to be heated rather than combusted in order to release volatile compounds that can form an aerosol. The aerosol-generating article may be a consumable, in particular a consumable to be discarded after a single use. The aerosol generating article may be an article, in particular a tobacco article, resembling conventional cigarettes.

As used herein, the term "aerosol-forming substrate" denotes a substrate formed from or comprising an aerosol-forming material that is capable of releasing volatile compounds upon heating for generating an aerosol. The aerosol forming substrate may contain a tobacco material or may contain a non-tobacco material or a combination of both, tobacco material and non-tobacco material. The aerosol forming substrate may be cellulose material impregnated with nicotine, preferably comprising one or more flavours. Advantageously, the aerosol-forming substrate comprises tobacco material, preferably homogenised tobacco material, preferably comprising one or more aerosol-formers. As used herein, the term "homogenised tobacco material" denotes a material formed by agglomerating particulate tobacco.

Preferably, the aerosol forming substrate contains volatile tobacco flavour compounds, which are released from the aerosol forming substrate upon heating. The aerosol forming substrate may comprise or consist of blended tobacco cut filler or may comprise homogenised tobacco material. Homogenised tobacco material may be formed by agglomerating particulate tobacco. The aerosol forming substrate may additionally comprise a non-tobacco-containing material, for example homogenised plant-based material other than tobacco.

Preferably, the aerosol forming substrate is a tobacco sheet, preferably crimped, comprising tobacco material, fibers, binder and aerosol former. Preferably, the tobacco sheet is a cast leaf. Cast leaf is a form of reconstituted tobacco that is formed from a slurry including tobacco particles, fiber particles, aerosol former, binder and for example also flavours.

Tobacco particles may be of the form of a tobacco dust having particles in the order of 30 micrometers to 250 micrometers, preferably in the order of 30 micrometers to 80 micrometers or 100 micrometers to 250 micrometers, depending on the desired sheet thickness and casting gap, where the casting gap typically defines the thickness of the sheet. The size of the tobacco particles refers to their Dv95 size in a volume distribution.

Fiber particles may include tobacco stem materials, stalks or other tobacco plant material, and other cellulose-based fibers such as wood fibers having a low lignin content. Fiber particles may be selected based on the desire to produce a sufficient tensile strength for the cast leaf versus a low inclusion rate, for example, an inclusion rate between approximately 2 percent to 15 percent. Alternatively, fibers, such as vegetable fibers, may be used either with the above fiber particles or in the alternative, including hemp and bamboo.

Aerosol formers included in the slurry forming the cast leaf or used in other aerosol forming substrates may be chosen based on one or more characteristics. Functionally, the aerosol former provides a mechanism that allows it to be volatilized and convey nicotine or flavouring or both in an aerosol when heated above the specific volatilization temperature of the aerosol former. Different aerosol formers typically vaporize at different temperatures. The aerosol-former may be any suitable known compound or mixture of compounds that, in use, facilitates formation of a dense and stable aerosol and that is substantially resistant to thermal degradation at the operating temperature of an inductive heating device the inductively heatable tobacco substrate shall be used with. An aerosol former may be chosen based on its ability, for example, to remain stable at or around room temperature but able to volatize at a higher temperature, for example, between 40 degree Celsius and 450 degree Celsius.

The aerosol former may also have humectant type properties that help maintain a desirable level of moisture in an aerosol forming substrate when the substrate is composed of a tobacco-based product, particularly including tobacco particles. In particular, some aerosol formers are hygroscopic material that functions as a humectant, that is, a material that helps keep a tobacco substrate containing the humectant moist.

One or more aerosol former may be combined to take advantage of one or more properties of the combined aerosol formers. For example, triacetin may be combined with glycerin and water to take advantage of the triacetin's ability to convey active components and the humectant properties of the glycerin.

Aerosol formers may be selected from the polyols, glycol ethers, polyol ester, esters, and fatty acids and may comprise one or more of the following compounds: glycerin, erythritol, 1,3-butylene glycol, tetraethylene glycol, triethylene glycol, triethyl citrate, propylene carbonate, ethyl laurate, triacetin, meso-Erythritol, a diacetin mixture, a diethyl suberate, triethyl citrate, benzyl benzoate, benzyl phenyl acetate, ethyl vanillate, tributyrin, lauryl acetate, lauric acid, myristic acid, and propylene glycol.

The aerosol-forming substrate may comprise other additives and ingredients, such as flavourants. The aerosol forming substrate preferably comprises nicotine and at least one aerosol-former.

A crimped tobacco sheet, for example a cast leaf, may have a thickness in a range of between about 0.5 millimeter and about 2 millimeter, preferably between about 0.8 millimeter and about 1.5 millimeter, for example 1 millimeter. Deviations in thickness of up to about 30 percent may occur due to manufacturing tolerances.

The aerosol forming substrate may include a gel. The aerosol forming substrate may include a porous medium loaded with gel. The porous medium forms a substrate that adsorb the gel. The gel is inserted in a component for an aerosol generating article.

In combination with specific embodiments, the gel is a mixture of materials capable of releasing volatile compounds into an aerosol passing through the aerosol generating article, preferably when the gel is heating. Advantageously the gel is solid at room temperature. "Solid" in this context means that the gel has a stable size and shape and does not flow. Room temperature in this context means 25 degrees Celsius.

The gel may comprise an aerosol-former. Ideally the aerosol-former is substantially resistant to thermal degradation at the operating temperature of the component. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Polyhydric alcohols or mixtures thereof, may be one or more of triethylene glycol, 1,3-butanediol and, glycerine or polyethylene glycol.

Advantageously, the gel, for example, comprises a thermoreversible gel. This means that the gel will become fluid when heated to a melting temperature and will set into a gel again at a gelation temperature. The gelation temperature may be at or above room temperature and atmospheric pressure. Atmospheric pressure means a pressure of 1 atmosphere. The melting temperature may be higher than the gelation temperature. The melting temperature of the gel may be above 50 degrees Celsius, or 60 degrees Celsius or 70 degrees Celsius and may be above 80 degrees Celsius. The melting temperature in this context means the temperature at which the gel is no longer solid and begins to flow.

Alternatively, in specific embodiments, the gel is a nonmelting gel that does not melt during use of the component. In these embodiments, the gel may release the active agent at least partially at a temperature that is at or above the operation temperature of the tubular element in use, but below the melting temperature of the gel.

In combination with specific embodiments the gel comprises a gelling agent. In specific embodiments the gel comprises agar or agarose or sodium alginate or Gellan gum, or a mixture thereof.

In specific embodiments the gel comprises water, for example, the gel is a a hydrogel.

Alternatively, in specific embodiments the gel is non-aqueous.

Preferably the gel comprises an active agent. In combination with specific embodiments the active agent comprises nicotine (for example, in a powdered form or in a liquid form) or a tobacco product or another target compound for, for example, release in an aerosol. In specific embodiments the nicotine is included in the gel with an aerosol-former.

In specific embodiments the gel comprises a solid tobacco material that releases flavour compounds when heated. Depending on the specific embodiments the solid tobacco material is, for example, one or more of: powder, granules, pellets, shreds, spaghettis, strips or sheets containing one or more of: plant material, such as herb leaf, tobacco leaf, fragments of tobacco ribs, reconstituted tobacco, homogenised tobacco, extruded tobacco and expanded tobacco.

There are embodiments where, additionally or alternatively, for example, the gel comprises other flavours, for example menthol. Menthol can be added either in water or in the aerosol former prior to the formation of the gel.

The gel preferably includes a gelling agent. The gelling agent may form a solid medium in which the aerosol-former may be dispersed.

The gel may include any suitable gelling agent. For example, the gelling agent may include one or more biopolymers, such as two or three biopolymers. Preferably, where the gel includes more than one biopolymer, the biopolymers are present in substantially equal weights.

The biopolymers may be formed of polysaccharides. Biopolymers suitable as gelling agents include, for example, gellan gums (native, low acyl gellan gum, high acyl gellan gums with low acyl gellan gum being preferred), xanthan gum, alginates (alginic acid), agar, guar gum, and the like. Preferably, the gel comprises agar.

The gel may comprise a divalent cation. Preferably the divalent cation includes calcium ions, such as calcium lactate in solution. Divalent cations (such as calcium ions) may assist in the gel formation of compositions that include biopolymers (polysaccharides) such as, gellan gums (native, low acyl gellan gum, high acyl gellan gums), xanthan gum, alginates (alginic acid), agar, guar gum, and the like. The ion effect may assist in the gel formation. The divalent cation may be present in the gel composition in a range from about 0.1 to about 1 percent by weight, or about 0.5 percent wt. In some embodiments, the gel does not include a divalent cation.

The gel may comprise a carboxylic acid. The carboxylic acid may include a ketone group. Preferably, the carboxylic acid includes a ketone group that has less than 10 carbon atoms. Preferably, this carboxylic acid has five carbon atoms (such as levulinic acid). Levulinic acid may be added to the neutralize the pH of the gel. This may also assist in the gel formation that includes biopolymers (polysaccharides) such as, gellan gums (low acyl gellan gum, high acyl gellan gums), xanthan gum, especially alginates (alginic acid), agar, guar gum, and the like. Levulinic may also enhance a sensory profile of the gel formulation. In some embodiments, the gel does not include a carboxylic acid.

Preferably the gel further comprises between 0.1 and 2 percent by weight nicotine. Preferably, the gel further comprises between 30 percent and 90 percent by weight (or between 70 and 90 percent by weight) glycerine. In specific embodiments a remainder of the gel comprises water and flavourings.

Additionally, or alternatively, in some specific embodiments, the aerosol forming substrate comprises a porous medium loaded with gel. The gel is adsorbed by the porous media which functions as a substrate for the gel.

As used herein, the term "aerosol generating device" is used to describe a device that interacts with an aerosol forming substrate of an aerosol-generating article for generating an aerosol. Preferably, the aerosol generating device is a puffing device that interacts with an aerosol forming substrate of an aerosol generating article to generate an aerosol that is directly inhalable by a user thorough the user's mouth.

With "component" of an aerosol generating article, an element used to form the aerosol generating article is meant. Preferably, the component is rod shaped. Preferably, the component is substantially cylindrical. In specific embodiments the component has an external diameter of between 5 millimetres and 12 millimetres, for example of between 5 millimetres and 10 millimetres or between 6 millimetres and 8 millimetres. Typically, the component has an external diameter of 7.2 millimetres plus or minus 10 percent. Preferably, the component is surrounded by wrapping paper. Typically, the component has a length between 5 millimetres and 15 millimetres. Preferably, the component has a length between 6 millimetres and 12 millimetres, preferably, the component has a length between 7 millimetres and 10 millimetres, preferably the component has a length of 8 millimetres.

As used herein, the term "susceptor" refers to a material that is capable to convert electromagnetic energy into heat. When located in an alternating electromagnetic field, eddy currents are induced and hysteresis losses occur in the susceptor causing heating of the susceptor. As the susceptor is located in thermal contact or close thermal proximity with the aerosol forming substrate, the aerosol forming substrate is heated by the susceptor such that an aerosol is formed. Preferably, the susceptor is arranged in direct physical contact with the aerosol forming substrate, for example within the aerosol forming tobacco substrate.

The susceptor may be formed from any material that can be inductively heated to a temperature sufficient to generate an aerosol from the aerosol forming substrate. Preferred susceptors comprise a metal or carbon. A preferred susceptor may comprise or consist of a ferromagnetic material, for example a ferromagnetic alloy, ferritic iron, or a ferromagnetic steel or stainless steel. A suitable susceptor may be, or comprise, aluminium. Preferred susceptors may be heated to a temperature in excess of 250 degrees Celsius. Suitable susceptors may comprise a non-metallic core with a metal layer disposed on the non metallic core, for example metallic tracks formed on a surface of a ceramic core. A susceptor may have a protective external layer, for example a protective ceramic layer or protective glass layer encapsulating the susceptor. The susceptor may comprise a protective coating formed by a glass, a ceramic, or an inert metal, formed over a core of susceptor material.

The susceptor may be a multi-material susceptor and may comprise a first susceptor material and a second susceptor material. The first susceptor material is disposed in intimate physical contact with the second susceptor material. The second susceptor material preferably has a Curie temperature that is lower than 500'C. The first susceptor material is preferably used primarily to heat the susceptor when the susceptor is placed in a fluctuating electromagnetic field. Any suitable material may be used. For example the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys.

Preferably, the susceptor has the form of a filament, rod, sheet or band. If the susceptor profile is of constant cross-section, for example a circular cross-section, it has a preferable width or diameter of between about 1 millimeter and about 5 millimeter. If the susceptor profile has the form of a sheet or band, the sheet or band preferably has a rectangular shape having a width preferably between about 2 millimeter and about 8 millimeter, more preferably, between about 3 millimeter and about 5 millimeter, for example 4 millimeter and a thickness preferably between about 0.03 millimeter and about 0.15 millimeter, more preferably between about 0.05 millimeter and about 0.09 millimeter, for example 0.07 millimeter.

According to the method of the invention, a component of an aerosol generating article is provided. The component has preferably the shape of a rod. Preferably, the component defines a longitudinal axis. The component defines a first end and a second end. The longitudinal axis connects the first end and the second end.

Preferably, a cross section of the component along a plane perpendicular to its longitudinal axis is a circle or an oval. However, the component may also have the cross-section of a rectangle or of a polygon.

Further, the component includes an aerosol forming substrate. The aerosol forming substrate may include an homogenized tobacco material. The aerosol forming substrate may include gel. The aerosol forming substrate may include a substrate adsorbing the gel. Preferably, most of the component is formed by the aerosol forming substrate. The aerosol forming substrate preferably fills the component completely, that is, voids, cavity and holes are not desired in the component.

The component further comprises a susceptor. Preferably, the susceptor is made of metal. The susceptor is in thermal contact with the aerosol forming substrate. The thermal contact is created in order to heat the aerosol forming substrate. Upon heating, the aerosol forming substrate releases aerosol. Preferably, the susceptor is surrounded by the aerosol forming substrate. Preferably, the susceptor defines a longitudinal axis. Preferably, the susceptor is completely contained in the component. Preferably, the susceptor is located in proximity of the first end of the component. Preferably, the susceptor extends from the first end to the second end of the component. Preferably, the longitudinal axis of the susceptor is parallel or forms an angle lower than 20 degrees with the longitudinal axis of the component. Preferably, the susceptor is inserted in the component. Preferably, the susceptor is positioned at a given position within the component. Preferably, the susceptor has the shape of a blade.

Preferably, the component is wrapped in a wrapping sheet.

A first polarized camera including a sensor to detect polarization information of electromagnetic radiation is also provided. The sensor preferably includes a polarizer array. Preferably, the polarizer array includes a plurality of polarization filters at a plurality of different polarization angles. Preferably, the sensor includes a CMOS sensor. The sensor may incorporate a layer of polarization filters above the photodiodes. The polarizer array layer may be placed on-chip and may comprise an air-gap nano-wire-grid coated with an anti-reflection material that suppresses flaring and ghosting. This on-chip placement reduces polarization crosstalk and improves extinction ratios.

The polarizer array may comprise four different directional polarization filters. A polarization filter may be placed on each pixel. Each polarization filter polarizes light along a polarization direction. Preferably, the four different polarization directions are at 90 degrees, 45 degrees, 135 degrees and 0 degrees. Every block of four pixels defines a calculation unit. The sensor using the different directional polarizers in the four pixel block design preferably allows the calculation of both the degree and direction of polarization of electromagnetic radiation.

The first polarized camera is preferably sensitive to an electromagnetic radiation having a wavelength range comprised between about 200 nanometers and about 2500 nanometers, more preferably between 400 nanometers and 1000 nanometers.

Preferably, the first polarized camera is the polarized machine vision camera of the XCG-CP series produced by Sony. Preferably, the first polarized camera uses XPL-SDKW Polarization Camera Software Development Kit.

The component is illuminated for example by an electromagnetic radiation source emitting electromagnetic radiation. Preferably, the whole component is illuminated, or only a part of the component. Preferably, the first end of the component is illuminated by the electromagnetic radiation. The electromagnetic radiation may be a focused beam of electromagnetic radiation. The electromagnetic radiation may be a diffuse electromagnetic radiation. The electromagnetic radiation source preferably emits electromagnetic radiation having a wavelength range comprised between about 200 nanometers and about 2500 nanometers, more preferably between 400 nanometers and 1000 nanometers. Preferably, the electromagnetic radiation has a wavelength in the visible range. Preferably, the electromagnetic radiation source includes a LED. The LED may be a white LED. Preferably, suitable optics may be included to focus the electromagnetic radiation on the first end of the component. The source of electromagnetic radiation is preferably positioned so that is capable of illumination the first end of the component.

The first polarized camera defines a field of view and the component is so positioned that it is located or is adapted to enter the field of view of the first polarized camera. Preferably, the component is so positioned that it is located or is adapted to enter the field of view of the first polarized camera wholly or just in part. Preferably, the component is so positioned that its first end is located or is adapted to enter the field of view of the first polarized camera.

The field of view of the polarized camera has a central axis, which is the optical axis of the optics included in the first polarized camera.

The electromagnetic radiation may be reflected, refracted or transmitted by the component, for example by a part of the component. The part of the component that may reflect, refract or transmit the electromagnetic radiation preferably includes the first end of the component. Some of this electromagnetic radiation coming from the component impinges on the sensor of the first polarized camera, so that it is detected by the first polarized camera. In the following by "electromagnetic radiation coming from the component", that electromagnetic radiation which has been reflected, refracted or transmitted by a part of the component is meant. The first polarized camera is adapted to generate a first image having a plurality of pixels. Each pixel of the first image contains polarization information of the detected electromagnetic radiation. Therefore, the first image contains polarization information of the electromagnetic radiation coming from the component.

For example, each pixel of the image may contain information about the polarization along a given direction. For example, the direction is the direction defined by one of the polarization filters contained in the sensor of the camera. For example, the first image is divided in clusters of four pixels, each pixel of the cluster containing polarization information, for example the polarization value, along one of the four directions identified by the polarization filters. The cluster of four pixels thus may contain the polarization values along four directions.

The first image may include elaborated polarization information. From the polarization values along one or more directions, different quantities may be calculated.

The first image may contain for each pixel the degree of polarization (DOP). The degree of polarization may be calculated for each pixel and displayed globally as a degree of polarization image. Degree of polarization (DOP) is a quantity used to describe the portion of an electromagnetic radiation which is polarized. A perfectly polarized radiation has a DOP of 100 percent, whereas an unpolarized radiation has a DOP of 0 percent. A radiation which is partially polarized, and therefore can be represented by a superposition of a polarized and unpolarized component, has a DOP between 0 percent and 100 percent. DOP is generally calculated as the fraction of the total power that is carried by the polarised component of the electromagnetic radiation.

The first image may contain for each pixel information about the polarization value along a single direction, the same direction for all pixels. This direction may be one of the polarization direction of the filter. The first polarized camera may generate four different images, one for each direction of polarization as defined by the polarization filters included in the camera sensor.

The first image may contain for each pixel information about the polarization value along a single direction, the same direction for all pixels, which is different from all directions defined by the polarization filters. This first image is obtained elaborating the polarization values along the different directions defined by the polarization filters obtained by the sensor.

The first image may contain, for each pixel, polarization information including the average of the polarization values along multiple directions. For example, in case of the four different directions defined by the four polarization filters, the first image may contain for each pixel a value which is the average of the four polarizations along the four different directions.

The first image may contain for each pixel polarization information containing the direction of polarization. This information can be processed and used to display a surface normal image. A surface normal image shows in each pixel the direction of the normal to the surface of the component.

On the basis of the polarization information present in the first image, the position of the susceptor may be identified. The position of the susceptor is not easily found using standard cameras. Using the polarization information displayed in the first image, the position of the susceptor in the component may be easily identified. The position of the susceptor within the component may be easily identified. Preferably, the identification of the position of the susceptor is done automatically using known image processing software or algorithms.

The position of the susceptor is identified using for example a control unit, such as a computer. The control unit may include suitable software for digital image analysis.

In case the susceptor is covered by other materials, such as gel, other information obtained elaborating the first image may be used to determine the susceptor's position. Further, information about the dimensions of the susceptor may be used to determine the susceptor's position.

Additional information about the component may be obtained elaborating the first image. For example, the dimension of the diameter of the component at the first end may be measured.

Preferably, the method include determining whether the location of the susceptor is correct. Determining whether the location is correct preferably includes comparing the detected position of the susceptor with an respected position of the susceptor. Determining whether the location is correct preferably includes comparing the detected position of the susceptor with a range of expected positions of the susceptor. The susceptor is preferably placed in the component so that it is completely surrounded by aerosol forming substrate. Further, the susceptor defines a susceptor axis. Preferably, the susceptor axis is substantially parallel to the longitudinal axis of the component. Therefore, the susceptor is considered not correctly located if the axis of the susceptor is not parallel to the longitudinal axis. The susceptor is considered not correctly located if the axis of the susceptor and the longitudinal axis form an angle greater than 20 degrees.

Preferably, the method comprises issuing a warning. If the susceptor is misplaced or not properly aligned, that is, when the location of the susceptor is not correct, preferably the method comprises the step of issuing a warning, for example to an operator. Alternatively, the warning or alarm is sent to a feedback loop device. The feedback loop device may modify the positioning of the susceptor in the component on the basis of the warning.

Preferably, the method includes evaluating from the polarization information present in the first image one of: degree of polarization; or angle of polarization. More preferably, one of degree of polarization or angle of polarization is calculated for each pixel of the first image. More preferably, both the degree of polarization and the angle of polarization is calculated. The first image thus may include for each pixel the DOP value or an angle value of the polarization. Preferably, the first image includes for each pixel the DOP value and an angle value of the polarization. The susceptor may be realized in metal. The degree of polarization image enhances the contrast between objects made of metal compared to other materials, because electromagnetic radiation is relatively highly polarized by metal. Localizing the susceptor and determining whether it is correctly located is relatively simple.

Preferably, the first polarized camera defines a first field of view having a first central axis; and the method comprises: providing a second polarized camera including a sensor to detect polarization information of electromagnetic radiation, the second polarized camera defining a second field of view having a second central axis, the second central axis forming an angle different from zero with the first central axis; detecting transmitted, reflected or refracted electromagnetic radiation from the component by the second polarized camera; generating a second image of the first end of the component by the second polarized camera, the second image being formed by a plurality of pixels, each pixel of the plurality of pixels containing polarization information about the detected electromagnetic radiation; and combining the polarization information contained in the first image with the polarization information contained in the second image to obtain a single combined image of the first end of the component. More preferably, the step of detecting transmitted, reflected or refracted electromagnetic radiation from the component by the second polarized camera included detecting transmitted, reflected or refracted electromagnetic radiation from the first end of the component by the second polarized camera. Preferably, a second polarized camera is provided. The second polarized camera obtains a second image of the first end of the component. Preferably, the second polarized camera is substantially identical to the first polarized camera. The second polarized camera defines a second field of view having a second central axis. The angle formed between the first axis of the first field of view of the first polarized camera and the second axis of the second field of view of the second polarized camera is different from zero or 180 degrees. Preferably, the polarization information contained in the first image are of the same type as the polarization information contained in the second image. For example, if the first image contains for every pixel information on the DOP, the second image contains information on the DOP as well. Preferably, the first image and the second image are taken substantially at the same time. The fact that the first axis of the first field of view of the first polarized camera and the second axis of the second field of view of the second polarized camera form an angle therebetween allows to combine the first image and second image and to obtain a substantially three-dimensional image. Preferably, the angle formed between the first axis and the second axis is comprised between about 5 degrees and about 60 degrees. In order to combine the first image and the second image, a stereoscopic vision algorithm may be used. By comparing information about the component from two angles, tree-dimensional information can be extracted by examining the relative positions of elements in the first image and in the second image. The three-dimensional image may allow a better identification of the position of the susceptor in the aerosol forming substrate. The three-dimensional image improves the recognisability of structures within the aerosol forming substrate, so the susceptor becomes more visible.

Preferably, the method comprises: providing an X-ray sensor; irradiating the component between the first end and the second end by an X-ray field; generating an X-ray image; and combining the information contained in the X-ray image with the information contained in the first image. The first polarized camera generates an image of the first end of the component. The polarized camera may not be capable of generating images of the inside of the component, but only of its surface. Therefore defects present inside the components which do not appear in the surface of the component are not detectable using a polarized camera. For generating images of the inside of the component, a X-ray sensor may be provided. The X-ray sensor detects a transmitted or reflected X-ray field impinging the component between the first end and the second end. The X-ray sensor is adapted to generate an X-ray image. This may allow to detect defects located inside the component and not visible on the surface of the component.

Preferably, the method comprises: providing a third polarized camera including a sensor to detect polarization information of electromagnetic radiation; detecting transmitted, reflected or refracted electromagnetic radiation from the component by the third polarized camera; and generating a third image of the second end of the component by the third polarized camera, the third image being formed by a plurality of pixels, each pixel of the plurality of pixels containing polarization information about the detected electromagnetic radiation; and detecting in the third image a position of the susceptor. More preferably, the first image and third image are generated substantially at the same time. Further preferably, the step of illuminating the component by electromagnetic radiation includes illuminating the first end and the second end of the component by electromagnetic radiation. More preferably, the step of detecting transmitted, reflected or refracted electromagnetic radiation from the component by the third polarized camera included detecting transmitted, reflected or refracted electromagnetic radiation from the first end of the component by the third polarized camera. In this way, the susceptor's position may be identified both at the first end and at the second end of the component. Misalignments of the susceptor can be identified on both ends of the component. The presence of two polarized cameras (the first polarized camera and the third polarized camera) allows the examination of the first end and the second end at the same time, reducing the manufacturing time. This may be useful also when two different susceptors at the two opposite end of the component are present.

Preferably, the method includes: illuminating the component by a first electromagnetic radiation; detecting transmitted, reflected or refracted first electromagnetic radiation from the component by the first polarized camera; generating the first image of the first end of the component, the first image being formed by a plurality of pixels, each pixel of the plurality of pixels containing polarization information about the detected first electromagnetic radiation; illuminating the component with a second electromagnetic radiation different from the first electromagnetic radiation; detecting transmitted, reflected or refracted second electromagnetic radiation from the component by the first polarized camera; generating a fourth image of the first end of the component by the first polarized camera, the fourth image being formed by a plurality of pixels, each pixel of the plurality of pixels containing polarization information about the detected second electromagnetic radiation; combining the polarization information contained in the first image with the polarization information contained in the fourth image to obtain a single combined image of the first end of the component.

The first electromagnetic radiation may differ from the second electromagnetic radiation in any characteristic. For example, the second electromagnetic radiation is diffuse while the first electromagnetic radiation is focused. The wavelength of the first electromagnetic radiation may be different from the wavelength of the second electromagnetic radiation. The angle at which the first electromagnetic radiation impinges on the first end of the component may be different from the angle at which the second electromagnetic radiation impinges on the first end of the component. Having two different light settings, such as the first electromagnetic radiation and the second electromagnetic radiation, allows to use the optimal electromagnetic radiation for a given analysis. For example, the first electromagnetic radiation is chosen so that the position of the susceptor may be easily detected in the first image, fourth image or combined image, while the second electromagnetic radiation is chosen so that another characteristic in the first image, fourth image or combined image may be easily detected.

Preferably, the third polarized camera defines a third field of view having a third central axis; and the method comprises: providing a fifth polarized camera including a sensor to detect polarization information of electromagnetic radiation, the fifth polarized camera defining a fifth field of view having a fifth central axis, the fifth central axis forming an angle different from zero with the third central axis; detecting transmitted, reflected or refracted electromagnetic radiation from the component by the fifth polarized camera; generating a fifth image of the second end of the component by the fifth polarized camera, the fifth image being formed by a plurality of pixels, each pixel of the plurality of pixels containing polarization information of the detected electromagnetic radiation; and combining the polarization information contained in the third image with the polarization information contained in the fifth image to obtain a single combined image of the second end of the component. As in the first end, a substantially three-dimensional image of the second end of the component may be obtained combining a third image and fifth image taken at different angles.

Preferably, the component defines a longitudinal axis and the first polarized camera has a first field of view, and the method comprises: providing a movable transport; providing a plurality of components on the movable transport with their longitudinal axes substantially parallel to each other; generating the first image of the first end for some of the components of the plurality that enter the first field of view of the first camera by the movement of the movable support. Preferably, the component is moved. During production of aerosol generating articles, the components are moved from one machine to another in order to be manufactured. In order to produce the components in a limited amount of time, the determination of the position of the susceptor is made while the components are moved, for example while processed. Interruption of manufacturing may be avoided or minimized. For this purpose, a moving element adapted to move a plurality of components arranged with their longitudinal axes parallel to each other is provided. The components are moved with parallel longitudinal axis so that their first ends is easily illuminated and may enter the field of view of the first polarized camera. The first polarized camera may take first images of the components in succession. The first polarized camera generates the first image as soon as a component enters in its field of view.

Preferably, the system also includes a trigger element adapted to identify the approach of the component and to send a signal to the electromagnetic radiation source to switch on the electromagnetic radiation source and illuminate the component. If a plurality of components is considered, the trigger element triggers the switching on of the electromagnetic radiation source each time a new component enters in the field of view of the first polarized camera. The electromagnetic radiation source may be stroboscopic.

Preferably, the component defines a longitudinal axis and the first polarized camera has a first field of view, and the method comprises: providing a drum; positioning a plurality of components on the drum with their longitudinal axes substantially parallel to each other; rotating the drum; and generating the first image of the first end for some of the components of the plurality that enters the first field of view of the first camera by the rotation of the drum. The movable element can be of any type. The polarized camera can be placed in several positions within the system to form components for aerosol generating articles.

Preferably, the method comprises: discarding the component on the basis of the position of the susceptor. If the susceptor is not correctly placed within the component, the component including the incorrectly positioned susceptor is preferably discarded. For example, compress air can be used to push away the undesired component.

Preferably, the system comprises: a moving element adapted to move a plurality of components arranged with their longitudinal axes parallel to each other.

Preferably the system comprises a rejection unit adapted to reject the component on the basis of the position of the susceptor. More preferably, the movable element comprises a drum or a conveyor belt.

Preferably, the first source of electromagnetic radiation includes a stroboscopic light adapted to illuminate the component at a given frequency. More preferably, the stroboscopic light includes optics to focus the electromagnetic radiation on the component.

Preferably, the system comprises a second source of electromagnetic radiation adapted to illuminate the component, the second source being different from the first source.

The invention will be now described in detail with non-limiting reference to the appended drawings, where:

FIG. 1 is a schematic perspective view of a first embodiment of system for the production of a component of an aerosol generating article;

FIG. 2 is a schematic lateral view of a second embodiment of system for the production of a component of an aerosol generating article;

FIG. 6 is a schematic front view of a component for an aerosol generating article:

FIG. 7 is a schematic lateral view of the component of FIG. 6;

FIG. 16 is a front view of a detail of the system of FIG. 2;

Figure 17:
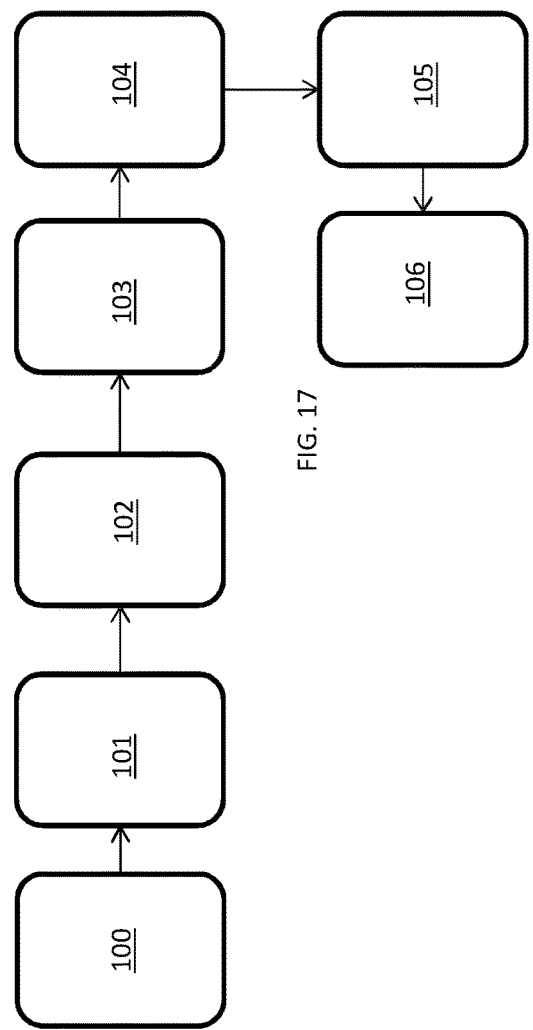
FIG. 17 is a schematic lateral view of a general system for the production of a component of an aerosol generating article.

In FIG. 17, a general system for the production of components 50 for aerosol generating articles is shown and globally indicated with 20.

The component 50 is represented schematically in FIGS. 6 and 7. The component 50 is rod shaped and defines a longitudinal axis 51. The component 50 includes a first end 52 and a second end 53, one opposite to the other. The first end 52 is shown in FIG. 6 in a front view.

The component 50 includes an aerosol forming substrate 54, depicted with dots in the components 50. Within the aerosol forming substrate 54, a susceptor 55 is inserted.

Figure 15:
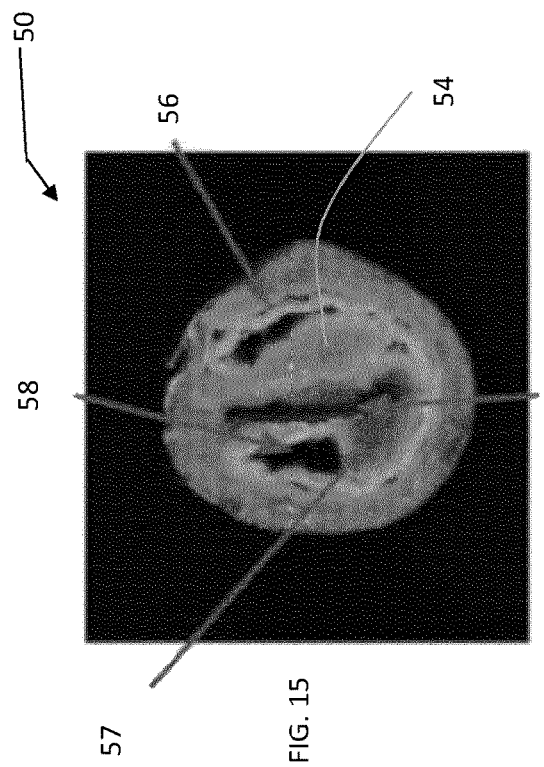
FIG. 15 is a picture of a component taken with a standard camera.

As shown in the image of the front view of the first end 52 of a component depicted in FIG. 15, in the present embodiment the aerosol forming substrate 54 includes a medium loaded with gel. The medium may be cotton. The FIG. 15 shows the medium 56, a portion of gel 57 separated from the medium 56, a hole 58 (that is, a volume free from any element) and the susceptor 55. As visible from this image of FIG. 15 taken with a standard camera, the susceptor 55 is hardly visible and can be confused with other elements, such as the hole.

In the general lateral view of FIG. 17, the system 20 includes a first polarized camera 4. The first polarized camera 4 defines a first field of view and it is adapted to generate first images containing information on the polarization of electromagnetic radiation which is detected by the camera. The first polarized camera 4 is positioned so that the first ends 52 of the components transported by the conveyor belt 2 can enter in the field of view of the first polarized camera 4. For example, the first polarized camera is placed in front of the first end 52 of component 50. Further, system 20 includes a source of electromagnetic radiation 6 to illuminate the first end 52 of component 50.

In FIG. 1, a first embodiment of the general system 20 is shown, indicated with the reference numeral 1. With the same reference numerals, the same elements described with reference to the system 20 of FIG. 17 are indicated.

The system 1 of FIG. 1 comprises a moving element, such as conveyor belt 2, adapted to transport the components 50. The components 50 are positioned on the conveyor belt 2 with their longitudinal axes 51 substantially parallel one to the other. The system 1 further comprises the first polarized camera 4. The first polarized camera 4 defines a first field of view and it is adapted to generate first images containing information on the polarization of electromagnetic radiation which is detected by the camera.

The first polarized camera 4 is positioned so that the first ends 52 of the components transported by the conveyor belt 2 can enter in the field of view of the first polarized camera 4 during the movement of the conveyor belt 2. In the depicted embodiment, the components 50 are aligned in such a way that the first polarized camera 4 forms an angle of view of approximately 0 degrees, that is, parallel, to the surface of the first end 52 of the components 50. System 1 also comprises a mirror 5 to split the optical path of the electromagnetic radiation coming from the components 50 in two components. In this way, the first polarized camera 4 can be mounted orthogonal to the longitudinal axis 51 (that is, the central optical axis of the first polarized camera and the longitudinal axis 51 of the component 50 are perpendicular) of the components 50, providing a compact solution. The mirror 5 can be movable so that possible inaccuracies of the relative position of the components 50 can be corrected without having to move the first polarized camera 4. System 1 also comprises a first source of electromagnetic radiation 6 adapted to illuminate the first ends 52 of the components 50. The first source 6 may emit only one specific wavelength. The first source preferably emits white light. As an example of the first source 6, a spotlight LED flashing bright white light can be used. First source 6 may be composed by one, preferably two or more spotlights, or a LED ring light, positioned in order to obtain uniform light and a specific illumination angle.

System 1 includes a control unit 30 adapted to control the first polarized camera 4 and elaborate first images generated by the first polarized camera 4.

In FIGS. 2 and 16, a second embodiment of the general system 20 is shown, indicated with the reference numeral 40. With the same reference numerals, the same elements described with reference to the system 1 of FIG. 1 are indicated. The difference between system 1 and system 40 lies on the moving element. Instead of a conveyor belt, the components 50 are positioned in a drum 8 rotating in a direction indicated with the arrow 9. The first polarized camera 4 is positioned on one side of the drum 8, so that the first ends 52 of the components 50 enter the field of view of the first polarized camera 4 while the drum 8 rotates. The drum 8 may be part of a combiner. As shown in FIG. 16, preferably the system 40 includes also mirror 5, which is used to direct the electromagnetic radiation coming from the component 50 to the first polarized camera 4. The first source 6 may be present in the system 40 as well (not shown in FIGS. 2 and 16).

Figure 3:
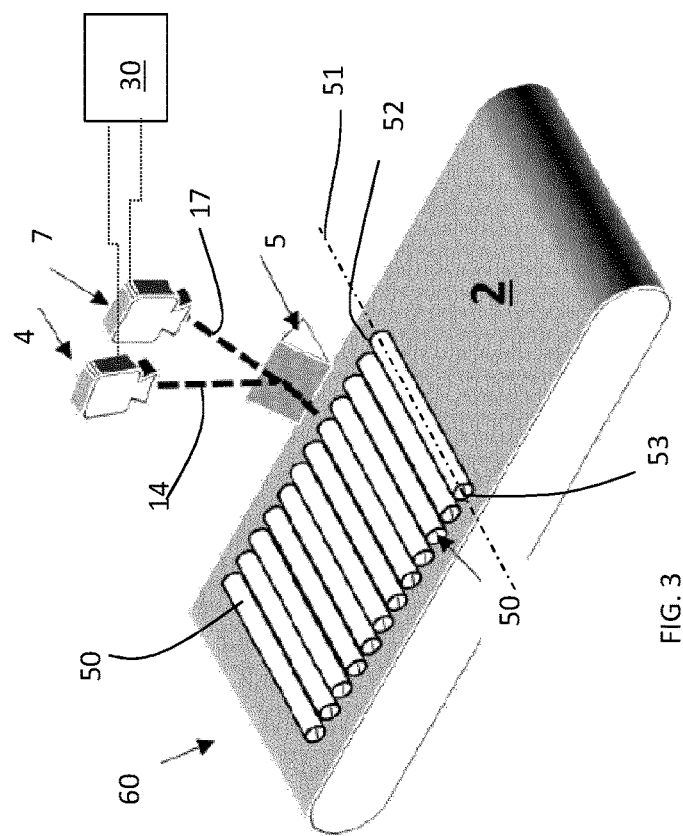
FIG. 3 is a schematic perspective view of a third embodiment of system for the production of a component of an aerosol generating article.

In FIG. 3, a third embodiment of the general system 20 is shown, indicated with the reference numeral 60. With the same reference numerals, the same elements described with reference to the system 1 of FIG. 1 are indicated. System 60 includes a first polarized camera 4 and a second polarized camera 7, preferably identical to the first polarized camera 4. The second polarized camera 7 is adapted to generate second images of the first end 52 of the component 50 including polarization information for each pixel. The second polarized camera 7 defines a field of view. In FIG. 3, the central axis 14 of the field of view of the first polarized camera 4 and the central axis 17 of the field of view of the second polarized camera 7 are shown. As shown, the first polarized camera and the second polarized camera are positioned with a slight horizontal offset one from the other, that is, the central axes of their respective fields of view form an angle therebetween. In this way, the first image and the second image of the first end 52 of the component 50 generated by the first polarized camera and by the second polarized camera, respectively, are taken from different angles. By superimposing the first image and the second image, a "stereo" combined image can be created that includes much more three-dimensional characteristics than a single first image or second image. In this way, three-dimensional structures positioned ant the first end 52 of component 50 may be made recognizable.

The second polarized camera 7 is also controlled by control unit 30 and the second images can be elaborate by the control unit 30.

Figure 4:
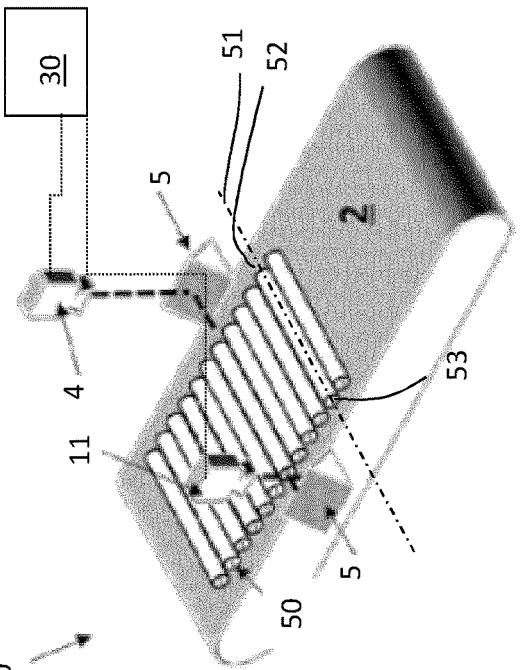
FIG. 4 is a schematic perspective view of a fourth embodiment of system for the production of a component of an aerosol generating article.

In FIG. 4, a fourth embodiment of the general system 20 is shown, indicated with the reference numeral 70. With the same reference numerals, the same elements described with reference to the system 1 of FIG. 1 are indicated. System 70 comprises a third polarized camera 11 adapted to generate third images of the second end 53 of the components 50. Therefore, while the conveyor belt 2 moves, the first polarized camera 4 generates a first image of the first end 52 of a component and the third polarized camera 11 generates a third image of the second end 53 of the component. Preferably, the first image and the third image are taken simultaneously. Thus, a misalignment of the susceptor 55 at the first end 52 and at the second end 53 can be detected.

The third polarized camera 11 is also controlled by control unit 30 and the third images can be elaborate by the control unit 30.

Figure 5:
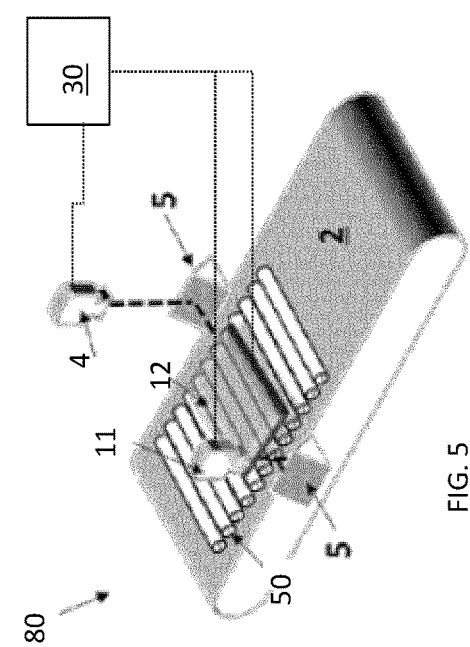
FIG. 5 is a schematic perspective view of a fifth embodiment of system for the production of a component of an aerosol generating article.

In FIG. 5, a fifth embodiment of the general system 20 is shown, indicated with the reference numeral 80. The system 80 includes the same elements as system 70 of FIG. 4, and in addition it comprises an additional X-ray imaging unit 12. The X-ray imaging unit 12 is suitable for taking a non-destructive image of the components 50 over the entire length of the component 50, between the first end 52 and the second end 53. The X-ray imaging unit 12 is adapted to generate X-ray images. The X-ray image can visually show different densities and thus a resolution and gradation of the individual elements such as paper, cotton, gel, holes, tobacco, and susceptor inside the components 50 can be obtained.

The X-ray imaging unit 12 is also controlled by control unit 30 and the X-ray images can be elaborate by the control unit 30. The X-ray imaging unit 12 can be applied in systems 1, 40, 60, 70 as well.

The system 1, 40, 60, 70 or 80 operates according to the method of the invention, schematically depicted in FIG. 17.

Figure 8:
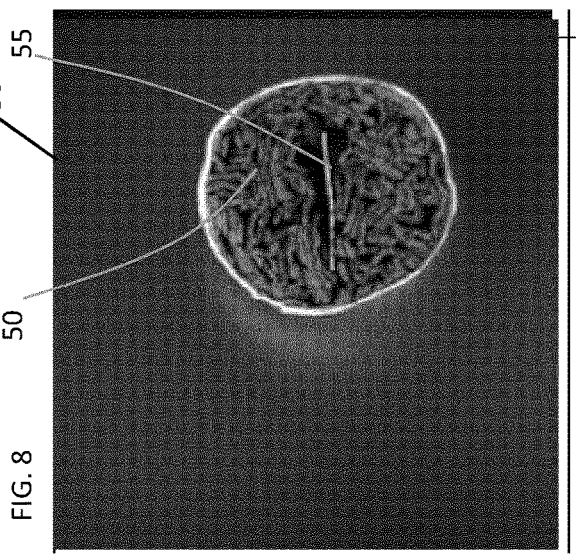
FIG. 8 is an image of a component taken with a polarized camera.
Figure 13:
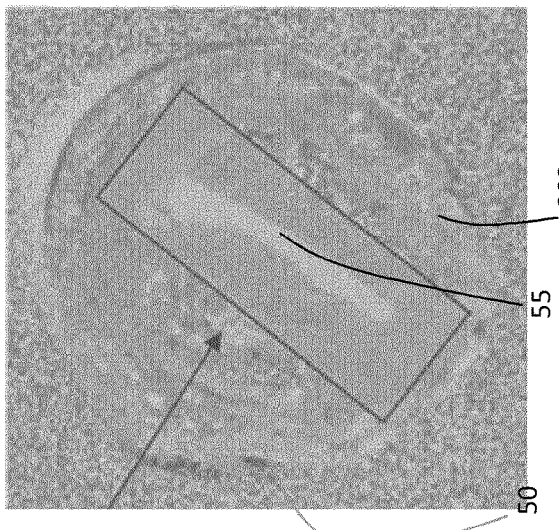
FIG. 13 is an elaboration of the image of FIG. 12 according to the method of the invention.

A plurality of components 50 are placed on a movable element in step 100, such as conveyor belt 2 or drum 8, with their longitudinal axes 51 parallel to each other. While the movable element 2 or 8 moves, each first end 52 of the components 50 enters in succession into the field of view of the first polarized camera 4, in step 101. In the same step 101, the second end 53 of the component may enter the field of view of the third polarized camera 11. In step 102, the first end 52 is illuminated by the first light source 6. The first light source 6 may be switched on by the component's approach. In step 103, a first image of the first end 52 is generated by the first polarized camera 4. In the same step, a third image of the second end 53 may be generated by the third polarized camera 11. The first image 90 is formed by a plurality of pixels. Each pixel contains polarization information of the electromagnetic radiation coming from the first end of the component. An example of a first image 90 is given in FIG. 8. In this image, each pixel shows the value of polarization along a given direction. There are 4 directions of polarization, therefore each pixel gives the value of the polarization along one of these four directions. A third image (not depicted) having the same characteristic of the first image 90 can be generated for the second end 53. Another example of first image 90 is given in FIG. 11.

Figure 10:
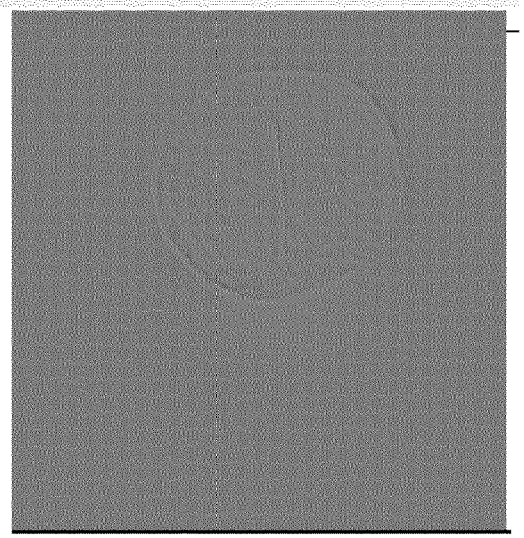
FIG. 10 is an elaboration of the image of FIG. 9 according to the method of the invention.
Figure 9:
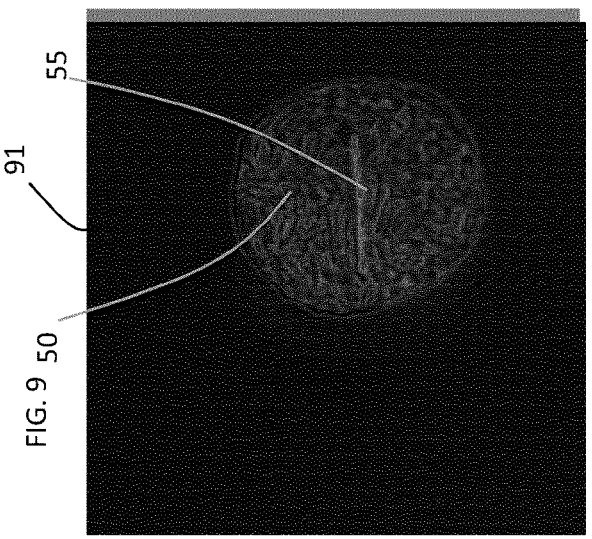
FIG. 9 is an elaboration of the image of FIG. 8 according to the method of the invention.

In step 104, control unit 30 elaborates the first image 90, generating an elaborate image 91. The elaborated image is depicted in FIG. 9. The elaborated image 91 for each pixel may show the DOP of the detected electromagnetic radiation by the first polarized camera 4. The same elaboration can take place for the third image. In FIG. 9 it is clear that the susceptor 55 is more visible in the elaborated image 91 than in the first image 90. The elaborated image 91 can be further elaborated in step 105, using standard machine vision algorithms, to obtain a further elaborated image 92 as depicted in FIG. 10. These algorithms may include one or more of: blob detection, edge detection, region growing. From the further elaborated image, in step 106 the position of the susceptor 55 can be identified.

Figure 14:
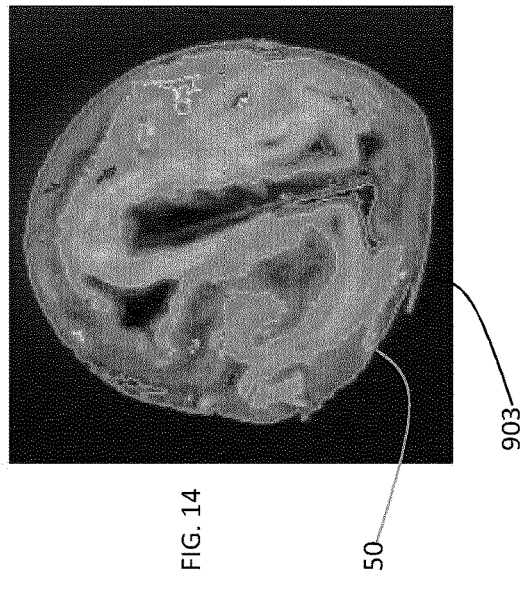
FIG. 14 is an elaboration of the image of FIG. 13 according to the method of the invention.
Figure 12:
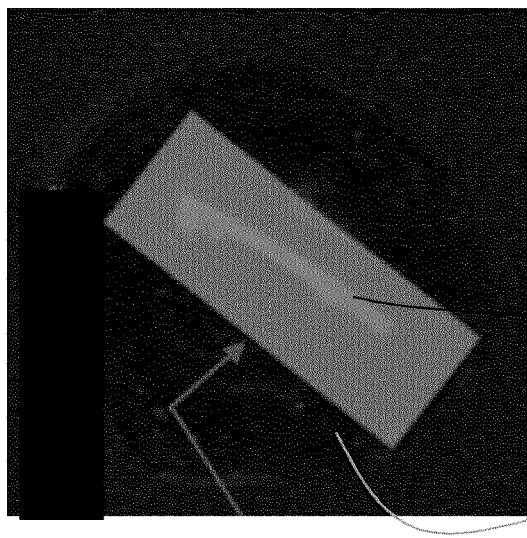
FIG. 12 is an elaboration of the image of FIG. 11 according to the method of the invention.
Figure 11:
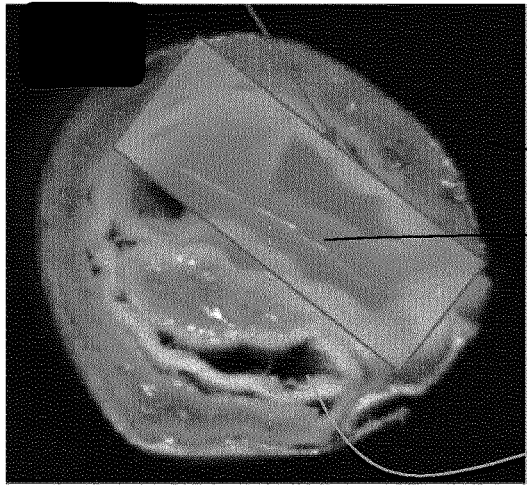
FIG. 11 is an image of a component taken with a polarized camera.

Another example of elaboration of a first image 900 obtained by the first polarized camera 4 is depicted with reference to FIGS. 11-14. FIG. 11 is the first image 900 in which each pixel shows the value of polarization along a given direction. There are 4 directions of polarization, therefore each pixel gives the value of the polarization along one of these four directions. Elaborated image 901 of FIG. 12 for each pixel may show the DOP of the detected electromagnetic radiation by the first polarized camera 4. A rectangle is used to highlight the position of the susceptor 55. Image 901 of FIG. 12 may be further elaborated in further elaborated image 902 of FIG. 13, to further enhance the susceptor's definition. In FIG. 14, a segmented image 903 of the first end 52 of the component is shown. The susceptor 55 is identified and located in the first end 52.

The invention claimed is:

1. A method for optical analysis of a component of an aerosol generating article, the method comprising:
   providing a component of an aerosol generating article defining a first end and a second end, the component comprising:
     an aerosol forming substrate;
     a susceptor in thermal contact with the aerosol forming substrate;
   providing a first polarized camera including a sensor to detect polarization information of electromagnetic radiation;
   illuminating the component by electromagnetic radiation;
   detecting transmitted, reflected or refracted electromagnetic radiation from the component by the first polarized camera;
   generating a first image of the first end of the component by the first polarized camera, the first image being formed by a plurality of pixels, each pixel of the plurality of pixels containing polarization information about the detected electromagnetic radiation; and
   detecting in the first image a position of the susceptor.

2. The method according to claim 1, including:
   evaluating from the polarization information in the first image one of:
     degree of polarization; or
     angle of polarization.

3. The method according to claim 1, wherein the first polarized camera defines a first field of view having a first central axis; and the method comprises:
   providing a second polarized camera including a sensor to detect polarization information of electromagnetic radiation, the second polarized camera defining a second field of view having a second central axis, the second central axis forming an angle different from zero with the first central axis;
   detecting transmitted, reflected or refracted electromagnetic radiation from the component by the second polarized camera;
   generating a second image of the first end of the component by the second polarized camera, the second image being formed by a plurality of pixels, each pixel of the plurality of pixels containing polarization information about the detected electromagnetic radiation;
   combining the polarization information contained in the first image with the polarization information contained in the second image to obtain a single combined image of the first end of the component.

4. The method according to claim 1, comprising:
   providing a third polarized camera including a sensor to detect polarization information of electromagnetic radiation;
   detecting transmitted, reflected or refracted electromagnetic radiation from the component by the third polarized camera;
   generating a third image of the second end of the component by the third polarized camera, the third image being formed by a plurality of pixels, each pixel of the plurality of pixels containing polarization information about the detected electromagnetic radiation;
   detecting in the third image a position of the susceptor.

5. The method according to claim 1, including:
   illuminating the component with a second electromagnetic radiation different from the electromagnetic radiation;
   detecting transmitted, reflected or refracted second electromagnetic radiation from the component by the first polarized camera;
   generating a fourth image of the first end of the component by the first polarized camera, the fourth image being formed by a plurality of pixels, each pixel of the plurality of pixels containing polarization information about the detected second electromagnetic radiation;
   combining the polarization information contained in the first image with the polarization information contained in the fourth image to obtain a single combined image of the first end of the component.

6. The method according to claim 1, wherein the component defines a longitudinal axis and the first polarized camera has a first field of view, the method comprising:
providing a movable transport;
positioning a plurality of components on the movable transport with their longitudinal axes substantially parallel to each other;
generating the first image of the first end for some of the components of the plurality of components that enters the first field of view of the first camera by the movement of the movable transport.

7. The method according to claim 1, wherein the component defines a longitudinal axis and the first polarized camera has a first field of view, the method comprising:
providing a drum;
positioning a plurality of components on the drum with their longitudinal axes substantially parallel to each other;
rotating the drum;
generating the first image of the first end for some of the components of the plurality of components that enters the first field of view of the first camera by the rotation of the drum.

8. The method according to claim 1, comprising:
discarding the component on the basis of the position of the susceptor.

9. System for the production of a component of an aerosol generating article, wherein the component comprises:
a longitudinal axis;
a first end and a second end;
an aerosol forming substrate;
a susceptor in thermal contact with the aerosol forming substrate;
the system comprising:
a first source of electromagnetic radiation adapted to illuminate the component;
a first polarized camera including a sensor to detect polarization information of electromagnetic radiation, the first polarized camera defining a first field of view, the first polarized camera being so arranged that the first end of the components is in the first field of view, the first polarized camera being adapted to generate a first image of the first end of the component, the first image being formed by a plurality of pixels, each pixel of the plurality of pixels containing polarization information of the electromagnetic radiation detected by the camera;
a control unit adapted to process the first image and to detect in the first image a position of the susceptor.

10. The system according to claim 9, comprising:
a moving element adapted to move a plurality of components arranged with their longitudinal axes parallel to each other.

11. The system according to claim 9, comprising a rejection unit adapted to reject the component on the basis of the position of the susceptor.

12. The system according to claim 10 wherein the moving element comprises a drum or a conveyor belt.

13. The system according to claim 9, wherein the source of electromagnetic radiation includes a stroboscopic light adapted to illuminate the component at a given frequency.

14. The system according to claim 13, wherein the stroboscopic light includes optics to focus the electromagnetic radiation on the component.

15. The system according to claim 9, including a second source of electromagnetic radiation adapted to illuminate the component, the second source being different from the first source.

* * * * *